(12) United States Patent
Chiriac (10) Patent No.: US 8,479,174 B2
(45) Date of Patent: Jul. 2, 2013

(54) METHOD, COMPUTER PROGRAM AND COMPUTER FOR ANALYZING AN EXECUTABLE COMPUTER FILE

(75) Inventor: Mihai Chiriac, Bucharest (RO)

(73) Assignee: Prevx Limited, Derby (GB)

( * ) Notice: Subject to any disclaimer, the term of this patent is extended or adjusted under 35 U.S.C. 154(b) by 1796 days.

(21) Appl. No.: 11/694,261

(22) Filed: Mar. 30, 2007

(65) Prior Publication Data

US 2008/0040710 A1 Feb. 14, 2008

Related U.S. Application Data

(60) Provisional application No. 60/789,156, filed on Apr. 5, 2006.

(51) Int. Cl.
*G06F 9/44* (2006.01)
*G06F 9/45* (2006.01)
*G06F 21/00* (2006.01)
*G06F 11/00* (2006.01)

(52) U.S. Cl.
USPC ............. 717/136; 717/138; 717/162; 711/6; 726/22; 726/23; 726/24

(58) Field of Classification Search
None
See application file for complete search history.

(56) References Cited

U.S. PATENT DOCUMENTS

| | | |
|---|---|---|
| 6,338,141 B1 | 1/2002 | Wells |
| 6,587,937 B1 * | 7/2003 | Jensen et al. ................. 711/173 |
| 6,772,346 B1 | 8/2004 | Chess et al. |
| 6,944,772 B2 | 9/2005 | Dozortsev |
| 7,013,483 B2 | 3/2006 | Cohen et al. |
| 7,093,239 B1 * | 8/2006 | van der Made ............... 717/135 |
| 2001/0052014 A1 | 12/2001 | Sheymov et al. |
| 2002/0099952 A1 | 7/2002 | Lambert |
| 2003/0023857 A1 | 1/2003 | Hinchlife |
| 2003/0084323 A1 | 5/2003 | Gales |
| 2003/0101381 A1 * | 5/2003 | Mateev et al. .................. 714/38 |
| 2003/0135791 A1 * | 7/2003 | Natvig ............................ 714/38 |

(Continued)

FOREIGN PATENT DOCUMENTS

| | | |
|---|---|---|
| EP | 1 315 066 | 5/2003 |
| EP | 1 280 040 | 3/2004 |

(Continued)

OTHER PUBLICATIONS

U.S. Appl. No. 11/477,807.

(Continued)

*Primary Examiner* — Insun Kang
(74) *Attorney, Agent, or Firm* — Sheridan Ross P.C.

(57) ABSTRACT

In one aspect, an executable computer file is partitioned into basic blocks of code. At least some basic blocks are translated into translated basic blocks. At least some translated basic blocks are linked in memory of a computer. At least some translated basic blocks on the computer are executed so as to enable the file to be unpacked or decrypted. In this way, the file can be analyzed to determine whether the file is or should be classed as malware. In another aspect, at least a read page of cache memory is created for at least some basic blocks and at least a write page of cache memory is created for at least some basic blocks. During the execution of a basic block, at least one of the read page and the write page is checked for a cached real address corresponding to the virtual address that is being accessed for said basic block.

35 Claims, 3 Drawing Sheets

U.S. PATENT DOCUMENTS

| | | | |
|---|---|---|---|
| 2003/0177394 A1 | 9/2003 | Dozortsev | |
| 2004/0006704 A1 | 1/2004 | Dahlstrom | |
| 2004/0039921 A1 | 2/2004 | Chuang | |
| 2004/0068618 A1* | 4/2004 | Hooker | 711/141 |
| 2004/0073810 A1 | 4/2004 | Dettinger | |
| 2004/0083408 A1 | 4/2004 | Spiegel | |
| 2004/0153644 A1 | 8/2004 | McCorkendale et al. | |
| 2004/0255165 A1* | 12/2004 | Szor | 713/201 |
| 2005/0021994 A1 | 1/2005 | Barton | |
| 2005/0027686 A1 | 2/2005 | Shipp | |
| 2005/0086500 A1 | 4/2005 | Albornoz | |
| 2005/0210035 A1 | 9/2005 | Kester | |
| 2008/0209562 A1* | 8/2008 | Szor | 726/24 |
| 2008/0320595 A1* | 12/2008 | van der Made | 726/24 |
| 2009/0271867 A1* | 10/2009 | Zhang | 726/24 |
| 2011/0238403 A1* | 9/2011 | Sargaison et al. | 703/26 |

FOREIGN PATENT DOCUMENTS

| | | |
|---|---|---|
| EP | 1 549 012 | 6/2005 |
| EP | 1536341 A2 | 6/2005 |
| JP | 3-233629 | 10/1991 |
| JP | 6-110718 | 4/1994 |
| JP | 9-504395 | 4/1997 |
| JP | 2003-196112 | 7/2003 |
| WO | WO 95/12162 | 5/1995 |
| WO | WO 96/30829 | 10/1996 |
| WO | WO 99/15966 | 4/1999 |
| WO | WO02/33525 | 4/2002 |
| WO | WO03/021402 | 3/2003 |
| WO | WO2004/097602 | 11/2004 |

OTHER PUBLICATIONS

Defeating Polymorphism: Beyond Emulation, Adrian E, Stepan.
"Ghostbuster 3", Mihai Chiriac.
Japanese Office Action issued in JP 2008-518975 on Sep. 13, 2011.
English Language Translation of Japanese Office Action issued in JP 2008-518975 on Sep. 13, 2011.
English Language Abstract and Translation of JP 6-110718 published Apr. 22, 1994.
English Language Abstract of JP 3-233629 published Oct. 17, 1991.
English Language Abstract of JP 2003-196112 published Jul. 11, 2003.
U.S. Appl. No. 60/789,156.
International Search Report issued in PCT/GB2006/002439 issued Jan. 15, 2007.
Zenkin, D., "Fighting Against the Invisible Enemy—Methods for detecting an unknown virus" Computers & Security, Elsevier Science Publishers; Amsterdam, NL; vol. 20; No. 4; Jul. 31, 2001; pp. 316-321, XP004254268.

* cited by examiner

METHOD, COMPUTER PROGRAM AND COMPUTER FOR ANALYZING AN EXECUTABLE COMPUTER FILE

This application claims the benefit of priority to U.S. application Ser. No. 60/789156, filed Apr. 5, 2006, the content of which is hereby incorporated by reference.

The present invention relates to a method, a computer program and a computer for analyzing an executable computer file.

The term "malware" is used herein to refer generally to any executable computer file that is or contains malicious code, and thus includes viruses, Trojans, etc. For convenience, however, and as is conventional, the term "virus" will also be used generically herein to refer to any of these types of malware.

A typical anti-virus product, such as anti-virus scanning software, scans files to look for signatures in the file that are known to be indicative of the presence of a virus. In order to try to defeat anti-virus products, the malware writers use obfuscation techniques in order to attempt to hide the signature of the virus code from detection. Typically, the obfuscation involves encrypting or packing the viral code. Anti-virus products typically incorporate fixed decryption algorithms to decrypt or unpack files that are encrypted or packed using known encryption algorithms, but this means that the anti-virus product has to be continually updated to include new decryption algorithms as new encryption algorithms appear. Moreover, the same or similar basic viral codes are encrypted using different encryption algorithms, which make it even harder for the anti-virus products to detect the viruses. Furthermore, modern so-called polymorphic viruses make the job of anti-virus products even more difficult because a polymorphic virus changes its encryption algorithm and the corresponding encryption keys each time it replicates from one computer to another. Accordingly, it is now very difficult or almost impossible for the makers of the anti-virus products to use fixed algorithms to decrypt polymorphic viruses.

Accordingly, different techniques were developed for decrypting polymorphic viruses in order to expose the underlying viral code. These include for example emulation and cryptanalysis. However, each of these techniques is rather slow, relatively speaking, and cannot successfully be run in real time on for example a user's personal computer. For example, in the early days of personal computers, say from about 1986 onwards, viruses were typically very small files of a few kilobytes (KB) and such small files can easily be emulated or analyzed in a short period of time (of less than 1 second say). On the other hand, polymorphic viruses are now often written in a high level language and can have a size of 2 megabytes (MB) or more and can contain upwards of 200 million instructions. Known emulation techniques can take 20 seconds to 1 minute or more to emulate such files, which clearly makes such techniques inappropriate and unacceptably slow for real-time "on the fly" use. Indeed, some current anti-virus products simply ignore files having large sizes (say over 1 MB) and/or those files that contain more than a certain number of instructions (say more than 10 or 20 million instructions), which clearly is not safe for the user.

Reference is now made to the paper "Defeating Polymorphism: Beyond Emulation" by Adrian Stepan of Microsoft Corporation published in "Virus Bulletin Conference October 2005". The entire content of the paper "Defeating Polymorphism: Beyond Emulation" is hereby incorporated by reference. This paper provides a good overview of current problems with polymorphic viruses. As discussed in the paper by Stepan, conventional emulation is relatively slow. In four examples given in the paper, decryption of a number of files using emulation took around one minute or more. This is clearly unacceptable to users who will expect any virus checking to be carried out almost invisibly, and within a handful of seconds at the most.

A method for decrypting malware to try to overcome this problem is disclosed in the paper by Stepan. In simple terms, the method operates as follows. First, the type of file is checked (whether for example the file is a Portable Executable file as defined by Microsoft or the Executable and Linking Format used in Linux). Then a virtual environment that depends on the file type is created, including for example virtual memory, virtual registers, etc. For example, a Windows-like environment is created for a PE file, and a Linux-like environment is created for an Elf file. The file is then mapped to the virtual environment. Then an instruction is fetched from the Instruction Pointer, the instruction is translated, and emulated. The Instruction Pointer is then updated. Depending on conditions at the time, the virtual environment is exited or the next instruction is translated and emulated.

To overcome the speed problems of emulation, the paper by Stepan proposes a technique in which the malware code is partitioned or disassembled into basic blocks of code. Then, a table is created having an entry for each block of code. Searching is carried out in the proposed method for each block of code rather than for each instruction. The use of blocks of code means that the table has significantly fewer entries than if it were to store an entry for each instruction, such that the search process is quicker. Once the basic blocks have been created from the original malware code, the decryption process in the method disclosed by Stepan proceeds as follows. In the virtual environment, a check is first made as to whether the current basic block has already been translated. If yes, then the translated code for that basic block is then executed; the Instruction Pointer is then updated and either the process exited or returned to the next basic block. If the current basic block has not already been translated, then it is translated and the translated code is executed in order to emulate the instructions associated with that basic block. The Instruction Pointer is then updated and either the process exited or returned to the next basic block.

As disclosed in the test examples in the paper by Stepan, this so-called dynamic translation of the malware code speeds up the decryption process by a factor of four to five or so, taking between seven and fifteen seconds to decrypt the test files. This process can handle on average about twenty million instructions per second, though in specific optimized cases, perhaps up to fifty million instructions per second can be handled. This processing time, especially the average processing time, is still nevertheless too slow to be acceptable for real time use, especially given the large file sizes of modern polymorphic viruses.

According to a first aspect of the present invention, there is provided a method of unpacking/decrypting an executable computer file using a host computer, the method comprising: partitioning the executable computer file into plural basic blocks of code; translating at least some of the basic blocks of code into translated basic blocks of code that can be executed by the host computer; linking at least some of the translated basic blocks of code in memory of the host computer; and, executing at least some of the translated basic blocks of code on the host computer so as to enable the executable computer file to be unpacked or decrypted, whereupon the unpacked or decrypted executable computer file can be analyzed to determine whether the executable computer file is or should be classed as malware.

In the present context, a basic block is a "straight-line" piece of code that has no jumps (or "branches") or jump targets within its body. If a jump target is present in the block, it is only at the start of the block (and in that case defines the start of the block). A jump is only at the end of the block, and thus defines the end of the block.

The translated code that is obtained in the preferred embodiment of this aspect is functionally equivalent to the corresponding original code but is safe to execute on the host computer. The memory is typically real memory of the host computer.

Linking the translated basic blocks makes the execution of those translated basic blocks faster. This is especially the case where the basic blocks are found in loops in the unpacking/decryption process. For example, when unpacking or decrypting a file, some blocks may execute 100,000 times or more, meaning that the unpacking/decryption loops can take more than 90% of the time needed to unpack/decrypt the file in the prior art methods. Linking provides a direct jump between the linked blocks, which can increase the speed of operation by up to a factor of 5 or more allowing on average around 100 million instructions per second to be processed, making the method viable in real-time with minimal interruption to the user even in the case of large and/or polymorphic viruses.

In a preferred embodiment, the method comprises, when a basic block of code is newly translated during the translating step, checking whether an already translated basic block of code has a jump instruction to the newly translated basic block of code and, if so, linking the newly translated basic block of code and the already translated basic block of code in memory.

In a preferred embodiment, a first translated basic block is linked to a second translated basic block by updating a branch instruction of the first translated basic block to point to the second translated basic block, or by inserting an unconditional branch instruction into the first translated basic block to jump to the second translated basic block, or by removing any existing branch instructions from the first translated basic block and physically moving the second translated basic block to the memory address that follows the first translated basic block.

Preferably, the linking of the translated basic blocks of code is carried out dynamically as the blocks are translated. This allows for the fact that during the translation, the size of some already-translated blocks and their addresses in memory may be changed and therefore linked basic blocks need to be re-linked to their new addresses. It should be borne in mind that a translated basic block may branch to a non-translated basic block. Accordingly, it is preferred that indirect jumps are used and that blocks are re-linked dynamically as they are translated.

In a preferred embodiment, the method comprises passing flow of the method to a virtual machine in the case of one or more of (i) a cache miss and (ii) a CPU exception arising during execution of said at least some of the translated basic blocks. In such cases, the virtual machine can be used to overcome the cache miss or CPU exception, which might otherwise halt the execution on the host computer, for example by providing updated cache addresses or information to overcome the CPU exception. Flow can then return to the execution on the host computer.

In a preferred embodiment, the method comprises emulating the executable file by executing the basic blocks of code, wherein the basic blocks of code that are translated are only those that execute more than a predetermined number of times during the emulation. Preferably, the value for said predetermined number of times is dynamically variable during the emulation.

In a preferred embodiment, the method comprises creating at least a read page of cache memory for at least some of the basic blocks, the read page of cache memory storing a read cached real address corresponding to a read cached virtual memory address for the respective basic block, and creating at least a write page of cache memory for at least some of the basic blocks, the write pace of cache memory storing a write cached real address corresponding to a write cached virtual memory address for the respective basic block, and comprising emulating the executable file by executing the basic blocks of code, and, during the execution of a basic block, checking at least one of the read page and the write page of cache memory for a cached real address corresponding to the virtual address that is being accessed for said basic block.

In practice, during the emulation, if there is a cached real address corresponding to the virtual address that is being accessed, that cached real address is used, else a memory mapper can be used to update the address(es) in the cache(s). The use of caches for basic blocks can significantly increase the speed of operation during emulation because, for example, provided there is present in a cache a cached real address that corresponds to a virtual address to be accessed, a translation between virtual memory and real memory addresses or other similar time-consuming operation can be avoided. In some cases it has been found that there is a high number of cache "hits", i.e. where there is present in a cache a cached real address that corresponds to a virtual address to be accessed, and such cases are particularly quick to analyze and unpack/decrypt. Such cases include those where the file is decrypted using linear decryption, common decompression techniques, etc.

In a preferred embodiment, the method comprises creating at least a stack page of cache memory for at least some of the basic blocks, the stack page of cache memory storing a stack cached real address corresponding to a stack cached virtual memory address for the respective basic block, and comprises, during the execution of a basic block, checking the stack page of cache memory for a cached real address corresponding to the virtual address that is being accessed for said basic block.

Some embodiments may use a set of cache pages for every instruction.

According to a second aspect of the present invention, there is provided a method of unpacking/decrypting an executable computer file using a host computer, the method comprising: partitioning the executable computer file into plural basic blocks of code; creating at least a read page of cache memory for at least some of the basic blocks, the read page of cache memory storing a read cached read address corresponding to a read cached virtual memory address for the respective basic block, and creating at least a write page of cache memory for at least some of the basic blocks, the write page of cache memory storing a write cached real address corresponding to a write cached virtual memory address for the respective basic block; and, emulating the executable file by executing at least some of the basic blocks of code so as to enable the executable computer file to be unpacked or decrypted, whereupon the unpacked or decrypted executable computer file can be analyzed to determine whether the executable computer file is or should be classed as malware; wherein during the execution of a basic block, at least one of the read page and the write page of cache memory is checked for a cached real address corresponding to the virtual address that is being accessed for said basic block.

As discussed above, the use of caches for basic blocks can significantly increase the speed of operation during emulation because, for example, provided there is present in a cache a cached read address that corresponds to a virtual address to be accessed, a translation between virtual memory and real memory addresses or other similar time-consuming operation can be avoided.

In a preferred embodiment, the method comprises creating at least a stack page of cache memory for at least some of the basic blocks, the stack page of cache memory storing a stack cached real address corresponding to a stack cached virtual memory address for the respective basic block, and comprises, during the execution of a basic block, checking the stack page of cache memory for a cached real address corresponding to the virtual address that is being accessed for said basic block.

The emulation is preferably carried out in virtual memory on the host computer. This keeps the real components of the host computer, including for example the real memory, real input/output devices, real storage devices, etc., safe from attack by the file that is being unpacked.

The partitioning is preferably carried oat dynamically. For example, new blocks might be discovered or existing blocks might be modified as a result of processing blocks that were previously discovered. This means that already-discovered basic blocks may have to be repartitioned and data about them restored as necessary.

In an embodiment, the executable computer file is a Portable Executable (PE) file. This file type is a file type specified by Microsoft Corporation as part of the original WIN32 specifications. Alternatively, the file might be of the Executable and Linking Format (ELF) used in Linux.

According to a third aspect of the present invention, there is provided a computer program for unpacking/decrypting an executable computer file using a host computer, the computer program comprising program instructions for causing a said host computer to carry out a method of: partitioning the executable computer file into plural basic blocks of code; translating at least some of the basic blocks of code into translated basic blocks of code that can be executed by the host computer; linking at least some of the translated basic blocks of code in memory of the host computer; and, executing at least some of the translated basic blocks of code on the host computer so as to enable the executable computer file to be unpacked or decrypted, whereupon the unpacked or decrypted executable computer file can be analyzed to determine whether the executable computer file is or should be classed as malware.

According to a fourth aspect of the present invention, there is provided, a computer program for unpacking/decrypting an executable computer file using a host computer, the computer program comprising program instructions for causing a said host computer to carry out a method of: partitioning the executable computer file into plural basic blocks of code; creating at least a read page of cache memory for at least some of the basic blocks, the read page of cache memory storing a read cached real address corresponding to a read cached virtual memory address for the respective basic block, and creating at least a write page of cache memory for at least some of the basic blocks, the write page of cache memory storing a write cached real address corresponding to a write cached virtual memory address for the respective basic block; and, emulating the executable file by executing at least some of the basic blocks of code so as to enable the executable computer file to be unpacked or decrypted, whereupon the unpacked or decrypted executable computer file can be analyzed to determine whether the executable computer file is or should be classed as malware; wherein during the execution of a basic block, at least one of the read page and the write page of cache memory is checked for a cached real address corresponding to the virtual address that is being accessed for said basic block.

The preferred embodiments of the computer programs provide computer programs that are arranged to carry out the preferred embodiments of the method described above.

According to a fifth aspect of the present invention, there is provided a method of analyzing an executable computer file using a host computer, the method comprising: partitioning the executable computer file into plural basic blocks of code; creating at least a read page of cache memory for at least some of the basic blocks, the read page of cache memory storing a read cached real address corresponding to a read cached virtual memory address for the respective basic block, and creating at least a write page of cache memory for at least some of the basic blocks, the write page of cache memory storing a write cached real address corresponding to a write cached virtual memory address for the respective basic block; emulating the executable file by executing the basic blocks of code, wherein, during the execution of a basic block, at least one of the read page and the write page of cache memory is checked for a cached real address corresponding to the virtual address that is being accessed for said basic block; translating those basic blocks of code that execute more than a predetermined number of times during the emulation into translated basic blocks of code that can be executed by the host computer; linking at least some of the translated basic blocks of code in memory of the host computer; and, executing at least some of the translated basic blocks of code on the host computer so as to enable the executable computer file to be unpacked or decrypted, whereupon the unpacked or decrypted executable computer file can be analyzed to determine whether the executable computer file is or should be classed as malware.

This most preferred method provides the maximum potential speed of operation by using emulation where possible and reasonable, using at least a read cache and a write cache for at least some of the basic blocks to minimise the number of times that a virtual address has to be mapped to a real address and vice versa during the execution of the basic blocks in the emulation, using execution of translated basic blocks when the basic blocks are found to be executed more than a certain number of times during emulation, and using linking of at least some of the translated basic blocks where possible to speed the execution of the translated basic blocks.

Preferred embodiments of this method correspond to the preferred embodiments of the methods described above. Similarly, there is also provided a computer program for causing a computer to carry out the method and a computer programmed to carry out the method.

Embodiments of the present invention will now be described by way of example with reference to the accompanying drawings, in which.

The preferred embodiment of an aspect of the present invention is implemented in a computer program which in use is installed and runs on a user's personal computer. The preferred embodiment operates generally as follows. In summary, the file is first inspected for type and "obvious" or known indicators that it is malware. Then, the running of the file on the host computer is emulated in a safe, virtual environment created on the host computer so as to allow the file to be unpacked/decrypted and to collect execution-level flags. Then, the image of the decrypted file is analyzed in combination with the API (application program interface) data obtained during the emulation to determine whether or not it is or should be classed as malware. These three main stages will be discussed in some detail below. Importantly, during the emulation stage, if it is found that any particular basic blocks of code are emulated more than a certain number of times, as can happen for example in loops that arise during the decryption process that occurs as part of the emulation of a packed/encrypted file, then those blocks of code are subject to special treatment as will be discussed below. Also importantly, during the emulation stage, cache memories are used for basic block addresses, which can significantly increase the speed of operation.

In the first main stage, the executable computer file that is to be analyzed to determine whether or not it is malware is firstly inspected to determine its format, including whether for example the file is of the Microsoft Portable Executable type or the Linux Executable and Linking Format type. (Much of the present specification assumes that the file is of the PE type, although the principles described herein are directly applicable and easily converted to be applicable to ELF and files.) As is known per se, the file can then be quickly searched to look for any obvious oddities that are known to be present in malware. Then the file is inspected to see if one or more of the following flags are present:

(i) the file is packed/compressed/encrypted, which can be determined by for example entropy analysis of the file. Malware is often packed or compressed or encrypted whereas non-malware files are usually not packed or compressed or encrypted;
(ii) the Entry Point is in the last section of the file;
(iii) the code section is writable, which is an indicator for self-modifying code;
(iv) there is a mismatch in the DataDirectory[x].VirtualAddress/Size and the [Last]SectionAdress/Size. Because for example the Microsoft PE loader does not check for these abnormalities, this is the place where many viruses reside;
(v) the file has undeclared internal overlays; and,
(vi) differences in the section flags/name and the DataDirectory flags (e.g. a file with a .reloc section, but no relocations).

Some of the flags are only found in malware. However, some flags may also be present in legitimate files, though such cases are very, very low in number.

In the second main stage, after these flags have been checked, the potentially malicious file is run in a virtual environment that emulates the real host computer. Details of the setting up and operation of the virtual environment for this emulation will be discussed further below. The emulation of the running of the file allows the detection of suspicious instructions, memory accesses, ETC (real time clock) accesses, internal windows structures accesses, exceptions, etc. A list of some of the execution-level flags that can be obtained is as follows:

(i) during the decryption/decompression, it is detected if the file is packed twice, which is common in malware but never used in real applications;
(ii) specific packers (such as Morphine, MoleBox, Mew) used by malware writers are detected;
(iii) common packers (such as UPX, Aspack) with slight modifications are detected. The slight modifications are used by malware writers as an anti-antivirus trick so that standard decompression does not work;
(iv) anti-debugging/anti-tracing tricks are detected;

(v) APIs (application program interfaces) are monitored. Packers/cryptors compress/encrypt the Import Table, so in a normal analysis session it is very hard to tell which functions are being used by a program. Some packers spend a great amount of code doing what is called "API redirection", that is they hijack the original API functions to a set of stubs that are created at runtime by the packer. Also, even if a memory dump of the program is available, the list of APIs may not be available since some packers use hashes and patch the ".idata" section directly. Since the preferred embodiment controls the entire decompression process, it can be detected when, the packer's code parses the export table of the DLLs in the virtual environment; and,
(vi) exported functions are monitored. Since many Trojans/backdoors use plug-ins (a famous example being Back Orifice), it is possible to say whether the file is a backdoor plug-in or not by simply analyzing the export data, as plug-ins need specific names/structures to work together correctly with the host.

After the (emulated) decompression has finished, not only is the above list of flags and APIs used by the program available, but also the real, unpacked/decrypted data is available, which is used in the subsequent analysis of the file.

In the third main stage, a detailed scan is made in the file's original, decrypted image, and the results combined with the API data to allow a determination to be made as to whether or not the file is or should be treated as malware.

Figure 1:
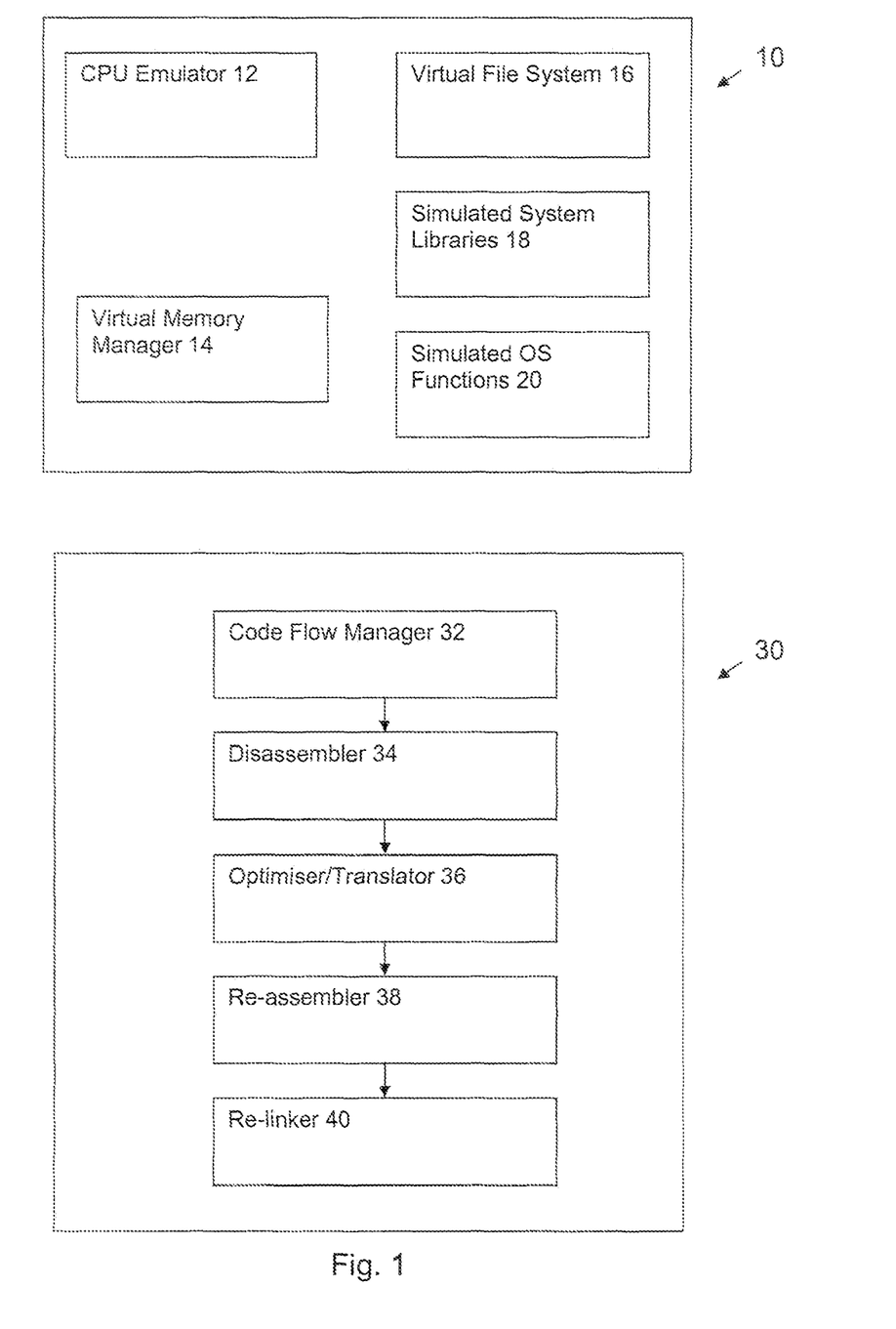
FIG. 1 shows schematically a functional block diagram of the operation of an example of a computer program according to an embodiment of the present invention.

Referring now to FIG. 1, the preferred computer program when running can be thought of as providing two main components, a virtual machine engine 10 and an optimisation engine 30. The virtual machine engine 10 is responsible for setting up the virtual machine environment which is used for the emulation in the second main stage discussed above. The optimisation engine 30 is responsible for ensuring that the process can be carried out sufficiently quickly.

The virtual machine engine 10 provides inter alia a CPU emulator 12, a virtual memory manager 14, a virtual file system 16, a set of simulated system libraries 18, and a set of simulated Windows-like operating system functions 20 (such as a memory mapper, a thread scheduler, a structured exception handler, etc.), which together make up an IA32 (32 bit Intel Architecture) emulator. The virtual machine engine 10 provides a module loader function which is responsible for checking the consistency of the main module ("module" being the name given to the in-memory version of a PE file when loaded into memory), i.e. for example whether the file is a valid PE file; for initialising the CPU/virtual memory; mapping the main module inside the virtual memory; setting pointers to the specific "Swap-In" routines; setting up the necessary structures (Process Environment Block, Thread Environment Block, Structured Exception Handler); and setting up a default stack and a default register set.

The CPU emulator 12 provides the necessary emulation of the host CPU, memory, input/output ports, etc. such that the virtual machine is, preferably, a complete clone of the host computer. The virtual CPU works the same as a normal, real CPU, using for example fetch/decode/emulate functions.

The virtual memory manager 14 is capable of virtualising a full 4 GB address space (even if the real, host memory is less than 4 GB). The virtual memory manager 14 enables analysis of any kind, of memory access, thus allowing the detection of potentially malicious files (by, for example, detecting an illegal access to system variables).

The virtual file system 16 enables monitoring of all accesses to the (virtual) file system by a potentially malicious file, which enables analysis through heuristics (i.e. patterns of behaviour). The virtual file system 16 may provide a number of "goat" files, which are files that are intended to lure malware into attacking or otherwise compromising them. Each goat file may have a "dirty" bit to indicate its status, the "dirty" bit initially being cleared and then being set whenever it is detected that the program file being analyzed is attempting to modify or overwrite the goat file.

The simulated system libraries 18, which are loaded on demand during emulation, are set depending on the import table or specific requirements of the program file being analyzed. Each time a simulated system library function gets called during the emulation, the virtual machine engine 10 checks its parameters and logs any unusual activity or results.

The simulated operating system functions 20 enable control over any low-level system functions, thus enhancing the detection capabilities.

The virtual machine engine 10 may also provide a set of virtual processes with antiviral names. These do not have any function other than to try to lure malware into attempting to attack them, typically by ending the process, which is again evidence that the program file being analyzed is malware.

The optimisation engine 30 provides inter alia a code flow manager 32, a disassembler 34, an optimiser/translator 36, a re-assembler 38 and a re-linker 40.

During the emulation, the code flow manager 32 creates "basic blocks" of code from the program file instructions that are being emulated by appropriately partitioning the program file instructions. As mentioned above, in the present context, a basic block is a "straight-line" piece of code that has no jumps (or "branches") or jump targets within its body. If a jump target is present in the block, it is only at the start of the block (and in that case defines the start of the block). A jump is only at the end of the block, and thus defines the end of the block. The code flow manager 32 also detects "hot spots", which will be discussed further below.

The code flow manager 32 also detects unusual changes in the code flow. For example, a buffer overflow is considered an unusual change in the code flow. By way of another example, the code flow manager 32 verifies whether "ret"-like instructions link correctly with "call"-like instructions. A return to an exported function, a return to an existing code block, generated, by a CALL instruction, and a return to the heap or stack can certainly be regarded as suspicious operations, and are reported accordingly.

Some basic blocks execute more often than others. In an encrypted program file for example, the decryption loops can take more than 90% of the time needed to decrypt the file. Those basic blocks and loops are often called "hot spots". What makes a basic block a "hot spot" depends on the virtual machine implementation. If N is taken as a threshold, then it can be said that "every basic block that executes for N times or more is a hot spot". By way of example only, N may be 40 or 400 or 1,000 or 10,000 or 20,000, or any integer in between. N may be varied dynamically during the emulation, depending on for example the presence and number of the flags present as found during the inspection of the file in the first main stage briefly mentioned above. In general, the value of N can be safely decreased, and the maximum number of emulated instructions safely increased, to provide a large improvement in the speed of analysis of malicious files whilst having only a small impact on the speed of analysis of files that are not malicious. The code flow manager 32 maintains a flag for every basic block and a "basic block execution count" to help in detecting time-consuming, possibly infinite loops, and to allow detection of hot spots by determining whenever a basic block of code is executed more than N times during the emulation.

Returning now to the description of the optimisation engine 30, the disassembler 34 takes the basic blocks of code provided by the code flow manager 32 and translates them into a set of internal instructions for the subsequent stages in the optimisation engine 30.

The optimiser/translator 36 removes unnecessary instructions from the translated instructions provided by the disassembler 34. Most polymorphic decryptors add garbage code to confuse analysis tools, and this is removed by the optimiser/translator 36. In practice, given that most of the variations between polymorphic or metamorphic viruses is in the garbage code and the translated/normalized code for the different generations of a particular virus are often very similar, this removal of unnecessary instructions makes detection of the virus much easier. The optimiser/translator 36 also changes the instruction(s) provided by the disassembler 34 by adapting them to the requirements of the virtual machine in which the emulation is run (e.g. by ensuring that memory accesses by the program file being analyzed are rerouted to the virtual memory), whilst preserving the logic of the program file.

Whenever the code flow manager 32 detects that a particular basic block of code has been emulated more than N times during the emulation process, the basic block is "translated". In other words, functionally equivalent code that is completely safe to execute directly on the real host processor is generated from the basic block. This translation of the basic blocks of code is done by the re-assembler 38.

The "hot spot" basic blocks of code are passed to the real host processor and memory for execution. Not only are the "hot spot" basic blocks executed on the real processor rather than in the virtual machine, but also the "hot spot" basic blocks are "linked" (or, in a sense, "re-linked") in the real memory by the re-linker 40. Linking is a significant contributor to the speed of operation of the preferred embodiment compared to the prior art. Linking provides a direct jump between the linked blocks and thus avoids the need to look up jump addresses with the associated laborious memory accesses, etc. during execution on the real host processor.

Linking of blocks can be achieved in a number of ways. For example, a first translated basic block can be linked to a second translated basic block by updating a branch instruction of the first translated basic block to point to the second translated basic block, or by inserting an unconditional branch instruction into the first translated basic block to jump to the second translated basic block, or by removing any existing branch instructions from the first translated basic block and physically moving the second translated basic block to the memory address that follows the first translated basic block. One or more of these techniques can be used to link any particular pair of blocks.

When a basic block of code is newly translated by the re-assembler 38, a check is made whether an already translated basic block of code has a jump instruction to the newly translated basic block of code. If so, the newly translated basic block of code is linked to the already translated basic block of code in memory.

It should be borne in mind that during the translation, the size of some already-translated blocks and their addresses in memory may be changed and therefore linked basic blocks need to be re-linked to their new addresses. However, a translated basic block may branch to a non-translated basic block. Accordingly, it is preferred that indirect jumps are used and that blocks are re-linked dynamically as they are translated.

This linking of basic blocks for execution in the real memory of the real host processor speeds the processing of the basic blocks. In the case especially of long decryption loops that span across many basic blocks, there can be a speed boost of a factor of 5 or more to 100 million instructions per second, which compares to the typical maximum of 20 million instructions per second that can be achieved in the prior art. In other words, a process that took say 5 seconds in the prior art, which is probably unacceptably long to most users, can be carried out in 1 second, which is more likely to be acceptable to most users. Practically speaking, a potentially malicious program file can be translated and re-linked and then allowed to decrypt practically at near real-speed. This makes the method viable in real time with minimal interruption to the user even for large and/or polymorphic viruses.

Figure 2:
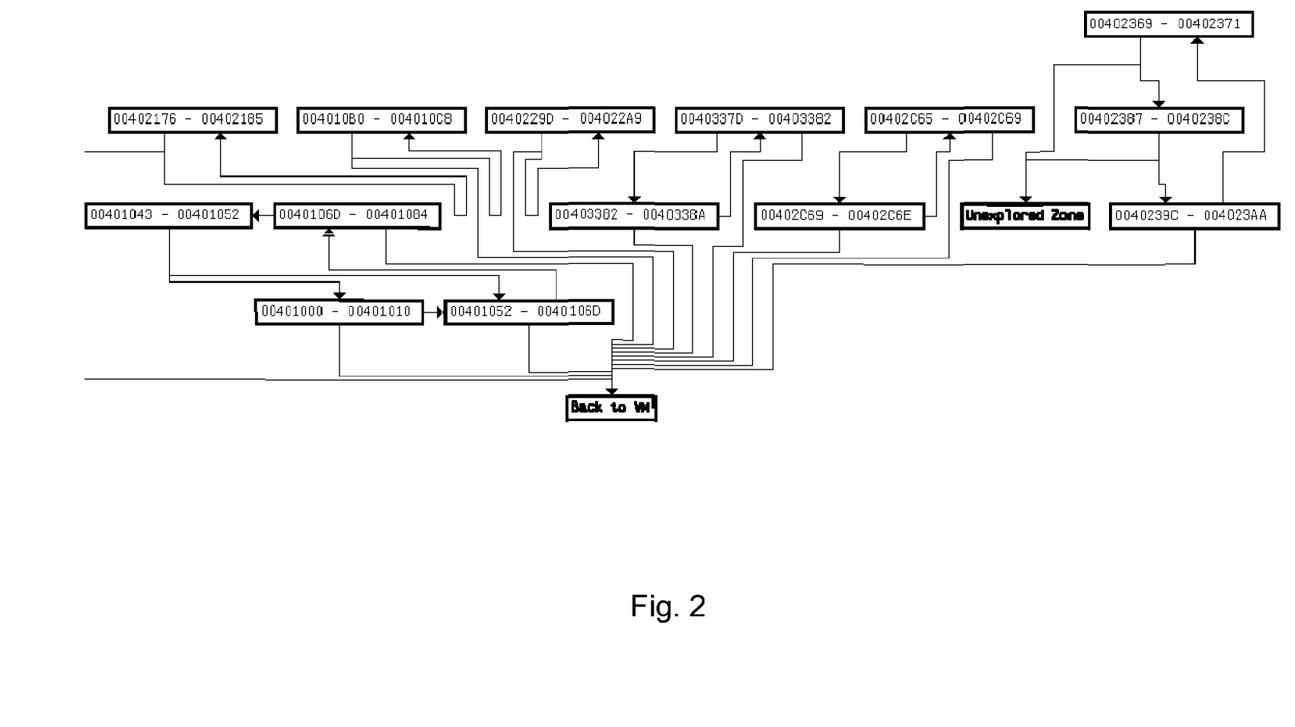
FIG. 2 shows schematically a block diagram of a first example of linked basic blocks of code; and, FIG. 3 shows schematically a block diagram of a second example of linked basic blocks of code.
Figure 3:
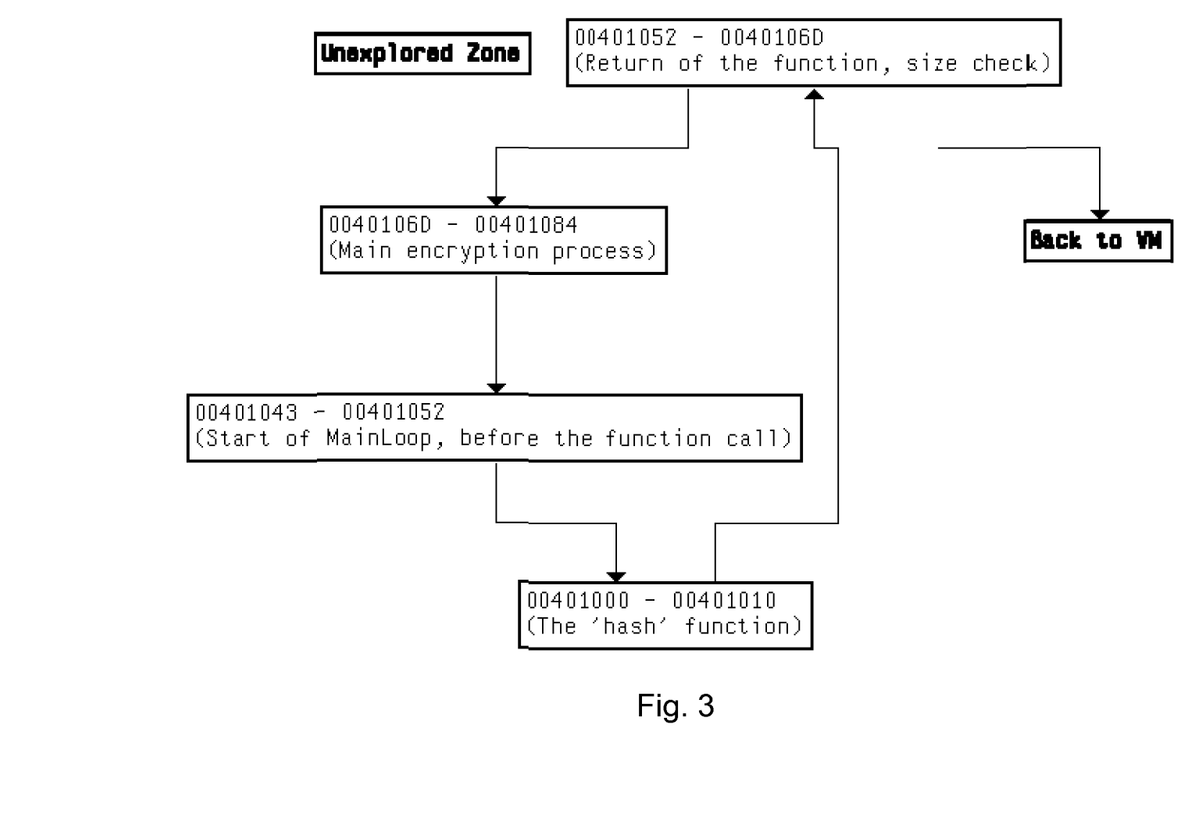

FIG. 2 shows schematically translated code blocks for a simple example when N (the threshold) is 40. FIG. 3 shows schematically the case where only the basic blocks that get emulated 400 times or more are linked. This provides a much clearer clear view of the decryption loop.

Whilst the translated basic blocks of code are executed on the real host processor in real memory, the virtual machine can be used when needed, for example in the case of a cache miss, CPU exception, etc.

An example of a "cache miss" is as follows. When a basic block is being translated prior to execution on the real host processor, information about the memory access(es) made by the basic block during the emulation is gathered by the virtual machine engine 10 and used to create cached pages of memory addresses, which are used during execution of the translated basic block on the real host processor. It can happen during this execution, for example after a number of iterations of the translated basic block, that an address being accessed is outside the range of these cached pages of memory addresses. In that case, the virtual machine engine 10 can take control of the process, check the type of memory access being attempted by the execution of the translated basic block, and load a new cache page with a new address for the address that is being accessed.

An example of a CPU exception such that the virtual machine engine 10 can take control of the process is as follows. Assume that a decompression loop consists of four basic blocks X, Y, Z and T. Assume that block X jumps to block Y, block Y jumps to block Z, block Z jumps to block T and block T jumps back to block X. Further assume that the re-assembler 38 cannot translate block T. In that case, during execution of the translated basic blocks on the real host processor, the flow would be as follows:

(i) execute X, which is linked to Y and so jumps to Y;
(ii) execute Y, which is linked to Z and so jumps to Z;
(iii) execute Z, which is linked to T and so would normally jump to T. However, T has not been translated.
Accordingly, flow returns to the virtual machine;
(iv) in the virtual machine, emulate T, notice that it would jump to X, and then return to (i).

In this way, if there is a CPU exception (on the real host processor), such as flow passing to a basic block that has not been translated, the virtual machine can take control to deal with the exception.

A separate important contributor to improving the speed of operation of the preferred embodiment is the use of cache pages of memory for each basic block of code for use during emulation. The use of cache pages during emulation and the linking method for the translated basic blocks for execution on the real host processor discussed above can be used individually or together.

Consider the following example code:

```
mov ecx, 10; the ECX register is set to 10
_begin: mov eax, [0x401000 + ecx * 4]; the 32 bit EAX
register gets the value from the address 0x401000 + ECX * 4
    mov [0x402000 + ecx * 4], eax; the value of EAX is
written to the address 0x402000 + ECX * 4
    loop _being; decrement ECX and jump to _being if ECX
is not 0
```

For the two memory accesses, the method disclosed in the paper by Stepan discussed above calls a function called a "memory mapper". Since the virtual, memory is, of course, virtual, a translation is required between the virtual and the real memory in order to be able to access the real memory where data is to be stored or fetched. Since in this method the memory mapper is invoked for every instruction that accesses memory, its simple presence is a problem for the execution speed of the emulator.

The preferred embodiment of the present method tries to minimise the number of times that, the memory mapper is invoked during emulation by using at least two separate pages of cache for every basic block, these being a "read" page and a "write" page. More preferably, there is a third page of cache for every basic block, a "stack" page. The cache pages are preferably created as the blocks are translated. This set up of the cache pages is based on the assumption that a single basic block accesses ONE "read" page, ONE "write" page and, sometimes, ONE stack page. This is true for most decryption engines. Some embodiments, however, may use a set of cache pages for every instruction.

In simple terms, the cache pages provide pairs of correspondences between real and virtual addresses, i.e. (a) a "read" cached virtual address—a "read" cached real address; (b) a "write" cached virtual address—a "write" cached real address; and (c) a "stack" cached virtual address—a "stack" cached real address.

Consider the case where a virus wants to access address 0xBAADF00D, with an instruction like mov eax, [0xBAADF00D]. This instruction reads a 32 bit value from the address 0xBAADFOOD into the EAX register. Assume that the virtual address 0xBAADF00D is mapped to the real address 0xDEADBABE.

When emulating, the process is like this:
a) decode the instruction, see that it is necessary to read a 32 bit word from the virtual address 0xBAADF00D;
b) parse the internal structures stored by the virtual machine engine 10; discover that virtual address 0xBAADF00D is mapped to the real address 0xDEADBABE;
c) read a 32 bit word from 0xDEADBABE, and put it into the EAX register.

Now imagine that the mov eax, [0xBAADF00D] instruction is inside a loop such that it is a hot spot and has to be translated.

As mentioned above, the method proposed by Stepan generates code like this:
a) call a Memory_Mapper function, for every memory access, "translate" the virtual address 0xBAADF00D to 0xDEADBABE;
b) access the memory from 0xDEADBABE.
This "translation", which implies parsing the internal structures of the virtual machine, takes time.

The caches of the present method are used like this:
a) see if address 0xBAADF00D is in the cache. If not, call a Memory_Mapper, and update the caches.
b) access the memory from 0xDEADBABE.

In the best case (linear decryption, common decompression, etc.), this provides a very good rate of cache hits and this greatly increases the speed of emulation of the basic blocks. In a very worst case, it is necessary to invoke the memory mapper, for example when an out-of-bound page access is requested, but then in that eventuality the present method is the same as the method proposed by Stepan.

For the example code given above, the pseudo-code for the generated code obtained in the present method is like this:

```
mov ecx, 10
_being:
    if (is_address_in_read_cache (0x401000 + ecx * 4) =
    FALSE) // happens rarely {
        call Memory Mapper
        put_address_in_read_cache (0x401000 + ecx * 4)
    }
    mov eax, [read_cache_address + offset]
    if (is_address_in_write_cache (0x402000 + ecx * 4) =
    FALSE) // happens rarely {
        call Memory Mapper
        put_address_in_write_cache (0x402000 + ecx * 4)
    }
    mov [write_cache_address + offset], eax
    loop _begin
```

One problem when dealing with memory accesses is inter-page-boundary accesses. Since the present method preferably uses an "on-demand" paging scheme, some addresses that are linear in the virtual memory may actually not be linear in the real memory manager. This is just a consequence of memory pages being loaded on demand and unloaded. For example, some pages that were not accessed for a long period of time may be unmapped as a consequence of memory needs. In extreme cases, the performance penalty is too high when it is necessary to generate two memory accesses (read and write) over two consecutive pages. So, preferably consecutive pages are kept linear in memory if needed (e.g. because an application does cross-page memory accesses).

Although the embodiments of the invention described with reference to the drawings comprise computer processes performed in computer apparatus and computer apparatus itself, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

Embodiments of the present invention have been described with particular reference to the examples illustrated. However, it will be appreciated that variations and modifications may be made to the examples described within the scope of the present invention.

The invention claimed is:

1. A method of unpacking or decrypting an executable computer file in a malware scanner using a host computer having a hardware processor, the method comprising:
   during emulation in a virtual memory on the host computer for malware detection:
   partitioning the executable computer file into plural basic blocks of code;
   creating at least a read page of a cache memory for at least some of the basic blocks, the read page of the cache memory storing a read cached real address corresponding to a read cached virtual memory address for a respective basic block, and creating at least a write page of the cache memory for at least some of the basic blocks, the write page of the cache memory storing a write cached real address corresponding to a write cached virtual memory address for a respective basic block;
   emulating the executable file by executing some basic blocks of code in the virtual memory on the host computer;
   checking, during the execution of said some basic blocks of code, at least one of the read page and the write page of the cache memory for a cached real address corresponding to the virtual address that is being accessed for a respective basic block of said some basic blocks of code;
   translating other basic blocks of code during the emulation into translated basic blocks of code that are functionally equivalent to said other basic blocks and which can be executed directly by the hardware processor of the host computer rather than by the virtual computer;
   linking at least some of the translated basic blocks of code in a real memory of the host computer; and
   executing at least some of the translated basic blocks of code on the host computer so as to enable the executable computer file to be unpacked or decrypted in the virtual memory, whereupon the unpacked or decrypted executable computer file can be analyzed to determine whether the executable computer file is or should be classed as malware.

2. The method according to claim 1, comprising, when a basic block of code is newly translated during the translating step, checking whether an already translated basic block of code has a jump instruction to the newly translated basic block of code and, if so, linking the newly translated basic block of code and the already translated basic block of code in the real memory.

3. The method according to claim 1, wherein a first translated basic block is linked to a second translated basic block by updating a branch instruction of the first translated basic block to point to the second translated basic block, or by inserting an unconditional branch instruction into the first translated basic block to jump to the second translated basic block, or by removing any existing branch instructions from the first translated basic block and physically moving the second translated basic block to the memory address that follows the first translated basic block.

4. The method according to claim 1, wherein the linking of the translated basic blocks of code is carried out dynamically as the blocks are translated.

5. The method according to claim 1, comprising passing flow of the method to a virtual machine in the case of one or more of (i) a cache miss and (ii) a CPU exception arising during execution of said at least some of the translated basic blocks.

6. The method according to claim 1, wherein the basic blocks of code that are translated are only those that execute more than a predetermined number of times during the emulation.

7. The method according to claim 6, wherein the value for said predetermined number of times is dynamically variable during the emulation.

8. The method according to claim 1, comprising creating at least a stack page of the cache memory for at least some of the basic blocks, the stack page of the cache memory storing a stack cached real address corresponding to a stack cached virtual memory address for a respective basic block, and comprising, during the execution of a basic block, checking the stack page of the cache memory for a cached real address corresponding to the virtual address that is being accessed for said basic block.

9. The method according to claim 1, wherein the partitioning is carried out dynamically.

10. The method according to claim 1, wherein the executable file is a Portable Executable File.

11. The host computer comprising a hardware processor programmed to carry out a method according to claim 1.

12. A computer program for unpacking or decrypting an executable computer file in a malware scanner using a host computer having a hardware processor, the computer program recorded on a non-transitory computer readable medium and comprising program instructions for causing a said host computer to carry out a method of:
during emulation in a virtual memory on the host computer for malware detection by the malware scanner:
partitioning the executable computer file into plural basic blocks of code;
creating at least a read page of a cache memory for at least some of the basic blocks, the read page of the cache memory storing a read cached real address corresponding to a read cached virtual memory address for a respective basic block, and creating at least a write page of the cache memory for at least some of the basic blocks, the write page of the cache memory storing a write cached real address corresponding to a write cached virtual memory address for a respective basic block;
emulating the executable file by executing some basic blocks of code in the virtual memory on the host computer;
checking, during the execution of said some basic blocks of code, at least one of the read page and the write page of cache memory for a cached real address corresponding to the virtual address that is being accessed for a respective basic block of said some basic blocks of code;
translating other basic blocks of code during the emulation into translated basic blocks of code that are functionally equivalent to said other basic blocks and which can be directly by the hardware processor of the host computer rather than by the virtual computer;
linking at least some of the translated basic blocks of code in a real memory of the host computer; and
executing at least some of the translated basic blocks of code on the host computer so as to enable the executable computer file to be unpacked or decrypted in the virtual memory, whereupon the unpacked or decrypted executable computer file can be analyzed in the virtual memory to determine whether the executable computer file is or should be classed as malware.

13. The computer program according to claim 12, wherein the computer program is arranged so that the method comprises, when a basic block of code is newly translated during the translating step, checking whether an already translated basic block of code has a jump instruction to the newly translated basic block of code and, if so, linking the newly translated basic block of code and the already translated basic block of code in the real memory.

14. The computer program according to claim 12, wherein the computer program is arranged so that a first translated basic block is linked to a second translated basic block by updating a branch instruction of the first translated basic block to point to the second translated basic block, or by inserting an unconditional branch instruction into the first translated basic block to jump to the second translated basic block, or by removing any existing branch instructions from the first translated basic block and physically moving the second translated basic block to the memory address that follows the first translated basic block.

15. The computer program according to claim 12, wherein the computer program is arranged so that the linking of the translated basic blocks of code is carried out dynamically as the blocks are translated.

16. The computer program according to claim 12, wherein the computer program is arranged so that flow of the method passes to a virtual machine in the case of one or more of (i) a cache miss and (ii) a CPU exception arising during execution of said at least some of the translated basic blocks.

17. A computer program according to claim 12, wherein the basic blocks of code that are translated are only those that execute more than a predetermined number of times during the emulation.

18. The computer program according to claim 17, wherein the computer program is arranged so that the value for said predetermined number of times is dynamically variable during the emulation.

19. A computer program according to claim 12, wherein the computer program is arranged so that the method comprises creating at least a stack page of the cache memory for at least some of the basic blocks, the stack page of the cache memory storing a stack cached real address corresponding to a stack cached virtual memory address for a respective basic block, and comprises, during the execution of a basic block, checking the stack page of the cache memory for a cached real address corresponding to the virtual address that is being accessed for said basic block.

20. computer program according to claim 12, wherein the computer program is arranged so that the partitioning is carried out dynamically.

21. The computer program according to claim 12, wherein the computer program is arranged so that the executable computer file is a Portable Executable File.

22. A computer program for unpacking or decrypting an executable computer file, the computer program recorded on a non-transitory computer readable medium and comprising program instructions for causing a host computer to carry out a method of:
during emulation in a virtual memory on a host computer for malware detection:
partitioning the executable computer file into plural basic blocks of code;
creating at least a read page of a cache memory for at least some of the basic blocks, the read page of the cache memory storing a read cached real address corresponding to a read cached virtual memory address for a respective basic block, and creating at least a write page of the cache memory for at least some of the basic blocks, the write page of the cache memory storing a write cached real address corresponding to a write cached virtual memory address for a respective basic block;
emulating the executable file by executing some of the basic blocks of code;

during the execution of said some of the basic blocks of code, checking at least one of the read page and the write page of the cache memory for a cached real address corresponding to the virtual address that is being accessed for a respective basic block of said some of the basic blocks of code;

translating basic blocks of code that execute more than a predetermined number of times during the emulation into translated basic blocks of code that can be executed by the host computer;

linking at least some of the translated basic blocks of code in a real memory of the host computer; and executing at least some of the translated basic blocks of code on the host computer so as to enable the executable computer file to be unpacked or decrypted, whereupon the unpacked or decrypted executable computer file can be analyzed to determine whether the executable computer file is or should be classed as malware.

23. The computer program according to claim 22, wherein the computer program is arranged so that the method comprises creating at least a stack page of a cache memory for at least some of the basic blocks, the stack page of the cache memory storing a stack cached real address corresponding to a stack cached virtual memory address for the respective basic block, and comprises, during the execution of a basic block, checking the stack page of the cache memory for a cached real address corresponding to the virtual address that is being accessed for said basic block.

24. The computer program according to claim 22, wherein the computer program is arranged so that the partitioning is carried out dynamically.

25. The computer program according to claim 22, wherein the computer program is arranged so that the executable computer file is a Portable Executable file.

26. A method of analyzing an executable computer file using a host computer, the method comprising:

during emulation in a virtual memory on a host computer for malware detection:

partitioning the executable computer file into plural basic blocks of code;

creating at least a read page of a cache memory of the host computer for at least some of the basic blocks, the read page of the cache memory storing a read cached real address corresponding to a read cached virtual memory address for a respective basic block, and creating at least a write page of the cache memory for at least some of the basic blocks, the write page of the cache memory storing a write cached real address corresponding to a write cached virtual memory address for a respective basic block;

emulating the executable file by executing some basic blocks of code, wherein, during the execution of a basic block of said some basic blocks of code, at least one of the read page and the write page of the cache memory is checked for a cached real address corresponding to the virtual address that is being accessed for said basic block;

translating basic blocks of code that execute more than a predetermined number of times during the emulation into translated basic blocks of code that can be executed by the host computer;

linking at least some of the translated basic blocks of code in a real memory of the host computer; and executing at least some of the translated basic blocks of code on the host computer so as to enable the executable computer file to be unpacked or decrypted, whereupon the unpacked or decrypted executable computer file can be analyzed to determine whether the executable computer file is or should be classed as malware.

27. The method according to claim 26, comprising, when a basic block of code is newly translated during the translating step, checking whether an already translated basic block of code has a jump instruction to the newly translated basic block of code and, if so, linking the newly translated basic block of code and the already translated basic block of code in the real memory.

28. The method according to claim 26, wherein a first translated basic block is linked to a second translated basic block by updating a branch instruction of the first translated basic block to point to the second translated basic block, or by inserting an unconditional branch instruction into the first translated basic block to jump to the second translated basic block, or by removing any existing branch instructions from the first translated basic block and physically moving the second translated basic block to the memory address that follows the first translated basic block.

29. The method according to claim 26, wherein the linking of the translated basic blocks of code is carried out dynamically as the blocks are translated.

30. The method according to claim 26, comprising passing flow of the method to a virtual machine in the case of one or more of (i) a cache miss and (ii) a CPU exception arising during execution of said at least some of the translated basic blocks.

31. The method according to claim 26, comprising creating at least a stack page of the cache memory for at least some of the basic blocks, the stack page of the cache memory storing a stack cached real address corresponding to a stack cached virtual memory address for the respective basic block, and comprising, during the execution of a basic block, checking the stack page of the cache memory for a cached real address corresponding to the virtual address that is being accessed for said basic block.

32. The method according to claim 26, wherein the value for said predetermined number of times is dynamically variable during the emulation.

33. The method according to claim 26, wherein the partitioning is carried out dynamically.

34. The method according to claim 26, wherein the executable computer file is a Portable Executable file.

35. The host computer comprising a hardware processor programmed to carry out a method according to claim 26.

* * * * *